(12) United States Patent
Mulla et al.

(10) Patent No.: US 6,557,078 B1
(45) Date of Patent: *Apr. 29, 2003

(54) CACHE CHAIN STRUCTURE TO IMPLEMENT HIGH BANDWIDTH LOW LATENCY CACHE MEMORY SUBSYSTEM

(75) Inventors: Dean A. Mulla, Saratoga, CA (US);
Terry L Lyon, Fort Collins, CO (US);
Reid James Riedlinger, Fort Collins, CO (US); Thomas Grutkowski, Fort Collins, CO (US)

(73) Assignees: Hewlett Packard Development Company, L.P., Houston, TX (US); Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/510,283

(22) Filed: Feb. 21, 2000

(51) Int. Cl.[7] ............................................... G06F 13/00
(52) U.S. Cl. ....................... 711/122; 711/131; 711/120; 711/119
(58) Field of Search ................................ 711/117, 119, 711/131

(56) References Cited

U.S. PATENT DOCUMENTS

| | | | | | |
|---|---|---|---|---|---|
| 5,623,628 | A | * | 4/1997 | Brayton et al. | 710/39 |
| 5,829,032 | A | * | 10/1998 | Komuro et al. | 711/117 |
| 6,065,098 | A | * | 5/2000 | Lippert | 711/118 |
| 6,138,218 | A | * | 10/2000 | Arimilli et al. | 711/141 |
| 6,226,713 | B1 | * | 5/2001 | Mehrotra | 711/118 |
| 6,260,117 | B1 | * | 7/2001 | Freerksen et al. | 66/201 |
| 6,427,189 | B1 | * | 7/2002 | Mulla et al. | 710/39 |

FOREIGN PATENT DOCUMENTS

WO     WO 98/13763    *   4/1998

* cited by examiner

*Primary Examiner*—Reba I. Elmore

(57) ABSTRACT

The inventive cache uses a queuing structure which provides out-of-order cache memory access support for multiple accesses, as well as support for managing bank conflicts and address conflicts. The inventive cache can support four data accesses that are hits per clocks, support one access that misses the L1 cache every clock, and support one instruction access every clock. The responses are interspersed in the pipeline, so that conflicts in the queue are minimized. Non-conflicting accesses are not inhibited, however, conflicting accesses are held up until the conflict clears. The inventive cache provides out-of-order support after the retirement stage of a pipeline.

25 Claims, 6 Drawing Sheets

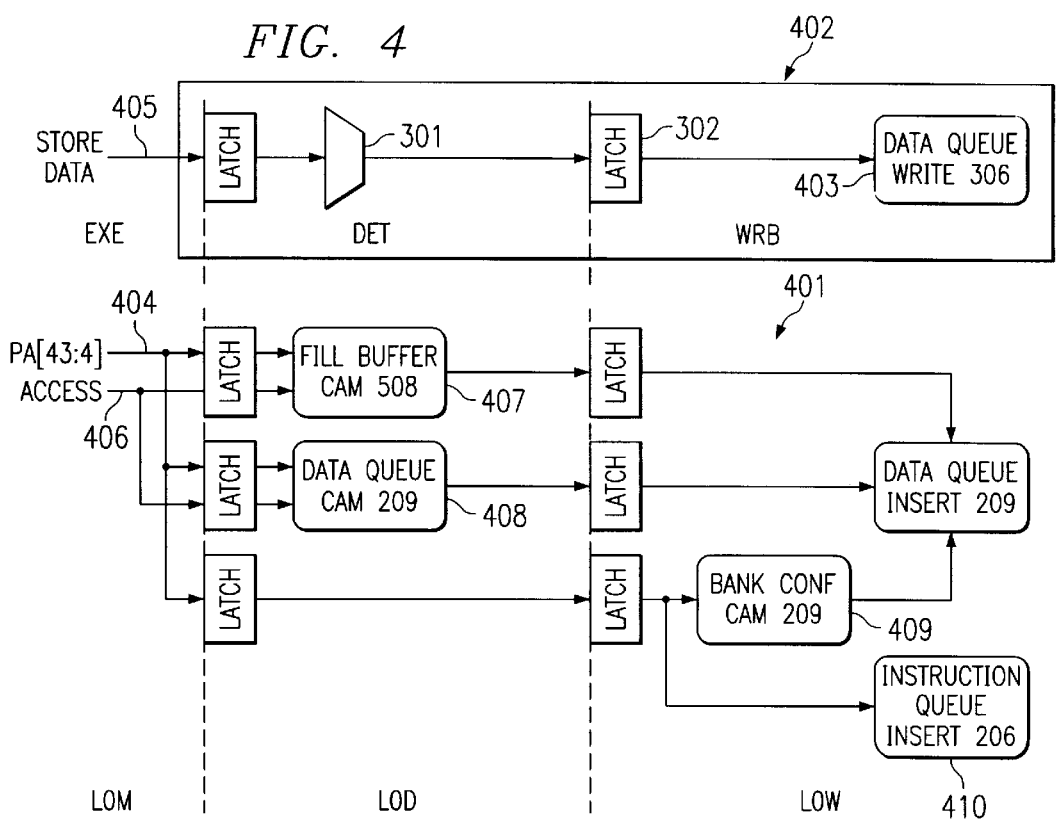
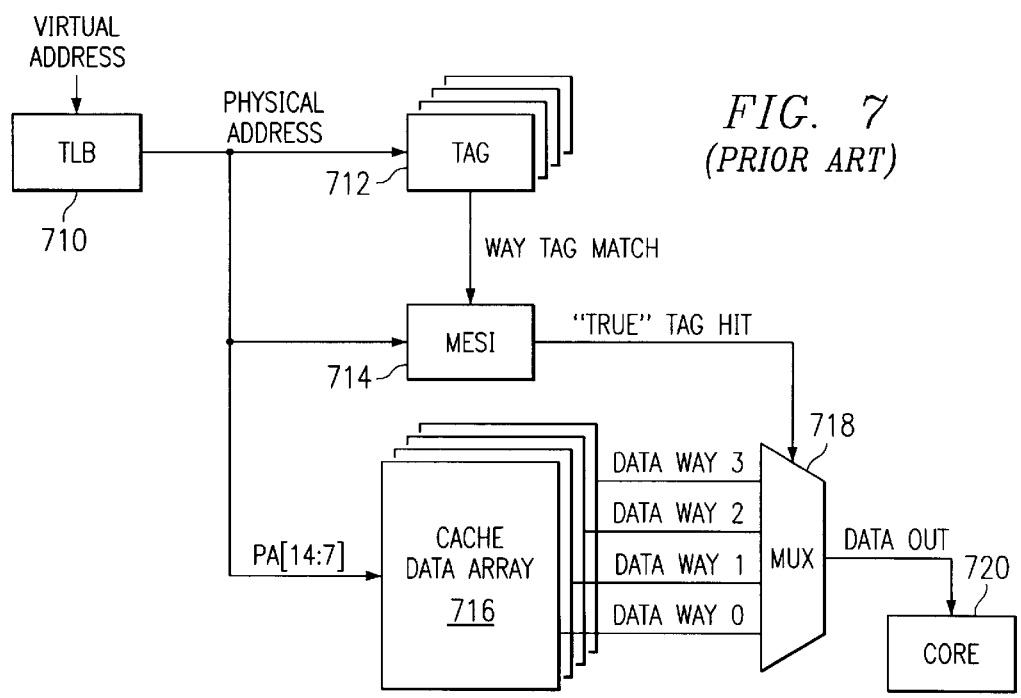

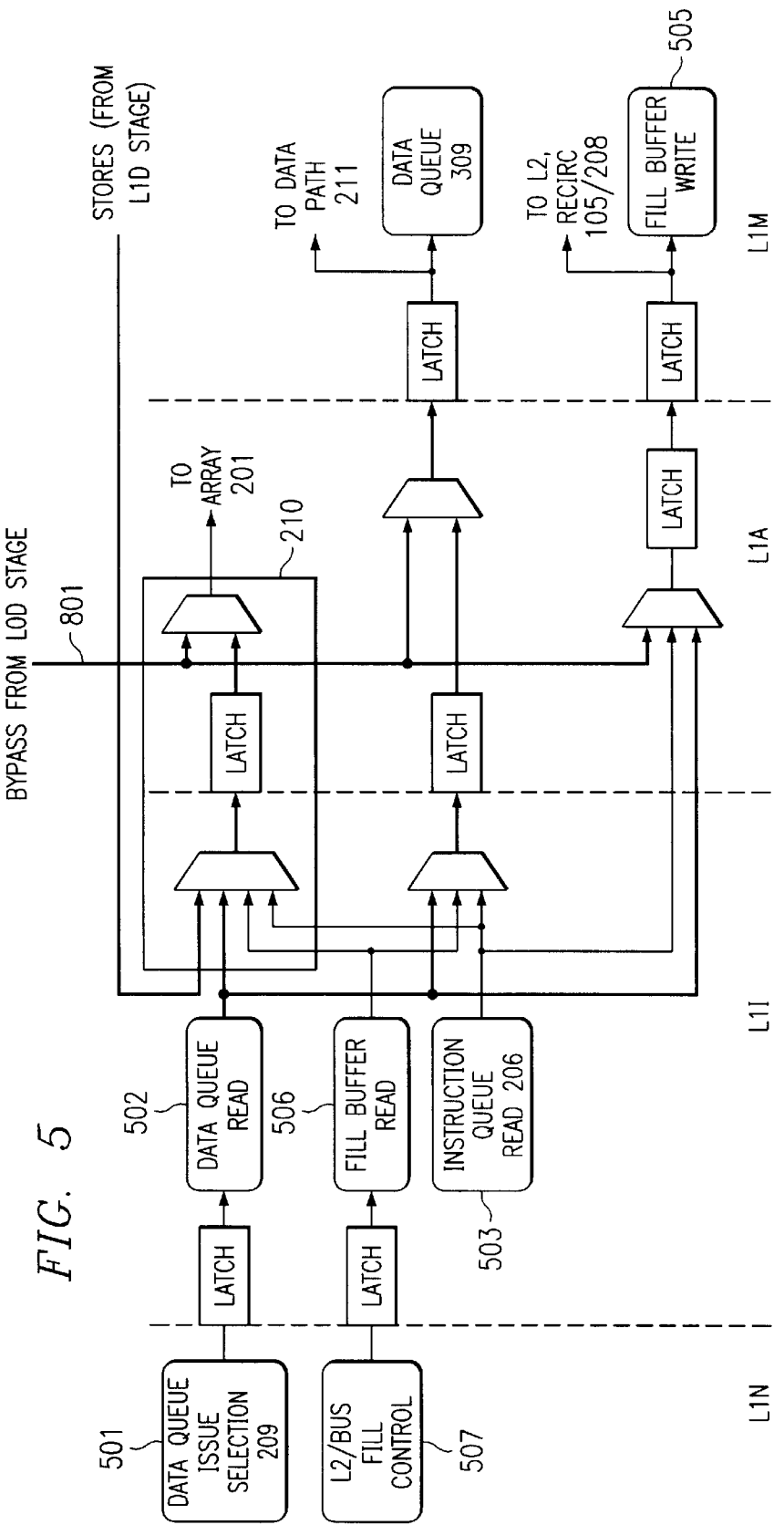

CACHE CHAIN STRUCTURE TO IMPLEMENT HIGH BANDWIDTH LOW LATENCY CACHE MEMORY SUBSYSTEM

RELATED APPLICATIONS

This application is related to and commonly assigned U.S. patent application Ser. No. 09/501,396 entitled "METHOD AND SYSTEM FOR EARLY TAG ACCESSES FOR LOWER-LEVEL CACHES IN PARALLEL WITH FIRST-LEVEL CACHE," co-pending and commonly assigned U.S. patent application Ser. No. 09/510,285 entitled "L1 CACHE MEMORY," co-pending and commonly assigned U.S. patent application Ser. No. 09/510,973 entitled "MULTI-LEVEL CACHE STRUCTURE AND METHOD USING MULTIPLE ISSUE ALGORITHM WITH OVER SUBSCRIPTION AVOIDANCE FOR HIGH BANDWIDTH CACHE PIPELINE," co-pending and commonly assigned U.S. patent application Ser. No. 09/510,279 entitled "CACHE ADDRESS CONFLICT MECHANISM WITHOUT STORE BUFFERS," co-pending and commonly assigned U.S. patent application Ser. No. 09/507,333 entitied "MULTI-PORTED REGISTER STRUCTURES WITH A PULSE WRITE MECHANISM," the disclosures of which are hereby incorporated herein by reference.

TECHNICAL FIELD

This invention relates in general to computer systems, and in specific to an arrangement for a cache memory system.

BACKGROUND

Computer systems may employ a multi-level hierarchy of memory, with relatively fast, expensive but limited-capacity memory at the highest level of the hierarchy and proceeding to relatively slower, lower cost but higher-capacity memory at the lowest level of the hierarchy. The hierarchy may include a small fast memory called a cache, either physically integrated within a processor or mounted physically close to the processor for speed. The computer system may employ separate instruction caches and data caches. In addition, the computer system may use multiple levels of caches. The use of a cache is generally transparent to a computer program at the instruction level and can thus be added to a computer architecture without changing the instruction set or requiring modification to existing programs.

Computer processors typically include cache for storing data. When executing an instruction that requires access to memory (e.g., read from or write to memory), a processor typically accesses cache in an attempt to satisfy the instruction. Of course, it is desirable to have the cache implemented in a manner that allows the processor to access the cache in an efficient manner. That is, it is desirable to have the cache implemented in a manner such that the processor is capable of accessing the cache (i.e., reading from or writing to the cache) quickly so that the processor may be capable of executing instructions quickly. Caches have been configured in both on chip and off-chip arrangements. On-processor-chip caches have less latency, since they are closer to the processor, but since on-chip area is expensive, such caches are typically smaller than off-chip caches. Off-processor-chip caches have longer latencies since they are remotely located from the processor, but such caches are typically larger than on-chip caches.

A prior art solution has been to have multiple caches, some small and some large. Typically, the smaller caches would be located on-chip, and the larger caches would be located off-chip. Typically, in multi-level cache designs, the first level of cache (i.e., L0) is first accessed to determine whether a true cache hit for a memory access request is achieved. If a true cache hit is not achieved for the first level of cache, then a determination is made for the second level of cache (i.e., L1), and so on, until the memory access request is satisfied by a level of cache. If the requested address is not found in any of the cache levels, the processor then sends a request to the system's main memory in an attempt to satisfy the request. In many processor designs, the time required to access an item for a true cache hit is one of the primary limiters for the clock rate of the processor if the designer is seeking a single-cycle cache access time. In other designs, the cache access time may be multiple cycles, but the performance of a processor can be improved in most cases when the cache access time in cycles is reduced. Therefore, optimization of access time for cache hits is critical for the performance of the computer system.

Prior art cache designs for computer processors typically require "control data" or tags to be available before a cache data access begins. The tags indicates whether a desired address (i.e., an address required for a memory access request) is contained within the cache. Accordingly, prior art caches are typically implemented in a serial fashion, wherein upon the cache receiving a memory access request, a tag is obtained for the request, and thereafter if the tag indicates that the desired address is contained within the cache, the cache's data array is accessed to satisfy the memory access request. Thus, prior art cache designs typically generate tags indicating whether a true cache "hit" has been achieved for a level of cache, and only after a true cache hit has been achieved is the cache data actually accessed to satisfy the memory access request. A true cache "hit" occurs when a processor requests an item from a cache and the item is actually present in the cache. A cache "miss" occurs when a processor requests an item from a cache and the item is not present in the cache. The tag data indicating whether a "true" cache hit has been achieved for a level of cache typically comprises a tag match signal. The tag match signal indicates whether a match was made for a requested address in the tags of a cache level. However, such a tag match signal alone does not indicate whether a true cache hit has been achieved.

As an example, in a multi-processor system, a tag match may be achieved for a cache level, but the particular cache line for which the match was achieved may be invalid. For instance, the particular cache line may be invalid because another processor has snooped out that particular cache line. As used herein a "snoop" is an inquiry from a first processor to a second processor as to whether a particular cache address is found within the second processor. Accordingly, in multi-processor systems a MESI signal is also typically utilized to indicate whether a line in cache is "Modified, Exclusive, Shared, or Invalid." Therefore, the control data that indicates whether a true cache hit has been achieved for a level of cache typically comprises a MESI signal, as well as the tag match signal. Only if a tag match is found for a level of cache and the MESI protocol indicates that such tag match is valid, does the control data indicate that a true cache hit has been achieved. In view of the above, in prior art cache designs, a determination is first made as to whether a tag match is found for a level of cache, and then a determination is made as to whether the MESI protocol indicates that a tag match is valid. Thereafter, if a determination has been made that a true tag hit has been achieved, access begins to the actual cache data requested.

Turning to FIG. 7, an example of a typical cache design of the prior art is shown. Typically, when an instruction requires access to a particular address, a virtual address is provided from the processor to the cache system. As is well-known in the art, such virtual address typically contains an index field and a virtual page number field. The virtual address is input into a translation look-aside buffer ("TLB") 710. TLB 710 is a common component of modern cache architectures that is well known in the art. TLB 710 provides a translation from the received virtual address to a physical address. Within a computer system, the virtual address space is typically much larger than the physical address space. The physical address space is the actual, physical memory address of a computer system, which includes cache, main memory, a hard drive, and anything else that the computer can access to retrieve data. Thus, for a computer system to be capable of accessing all of the physical address space, a complete physical mapping from virtual addresses to physical addresses is typically provided.

Once the received virtual address is translated into a physical address by the TLB 710, the index field of such physical address is input into the cache level's tag(s) 712, which may be duplicated N times for N "ways" of associativity. As used herein, the term "way" refers to a partition of the cache. For example, the cache of a system may be partitioned into any number of ways. Caches are commonly partitioned into four ways. The physical address index is also input to the cache level's data array(s) 716, which may also be duplicated N times for N ways of associativity.

From the cache level's tag(s) 712, a way tag match signal is generated for each way. The way tag match signal indicates whether a match for the physical address was made within the cache level's tag(s) 712. As discussed above, in multi-processor systems, a MESI protocol is typically utilized to indicate whether a line in cache is modified, exclusive, shared, or invalid. Accordingly, in such multi-processor systems the MESI protocol is combined with the way tag match signal to indicate whether a "true" tag hit has been achieved for a level of cache. Thus, in multi-processor systems a true tag hit is achieved when both a tag match is found for tag(s) 712 and the MESI protocol indicates that such tag match is a valid match. Accordingly, in FIG. 7, MESI circuitry 714 is utilized to calculate a "true" tag hit signal to determine whether a true tag hit has been achieved for that level of cache. Once it is determined from the MESI 714 that a "true" tag hit has been achieved for that level of cache, then that cache level's data array(s) 716, which may also be duplicated N times for N ways of associativity, are accessed to satisfy the received memory access request. More specifically, the true tag hit signal may be used to control a multiplexer ("MUX") 718 to select the appropriate data array way to output data to satisfy the received memory access request. The selected data from data array(s) 716 is output to the chip's core 720, which is the particular execution unit (e.g., an integer execution unit or floating point execution unit) that issued the memory access request to the cache.

In view of the above, prior art caches are typically implemented in a serial fashion, with each subsequent cache being connected to a predecessor cache by a single port. Thus, prior art caches have been only able to handle limited numbers of requests at one time. Therefore, the prior art caches have not been able to provide high enough bandwidth back to the CPU core, which means that the designs of the prior art increase latency in retrieving data from cache, which slows the execution unit within the core of a chip. That is, while an execution unit is awaiting data from cache, it is stalled, which results in a net lower performance for a system's processor.

SUMMARY OF THE INVENTION

These and other objects, features and technical advantages are achieved by a system and method which uses an L1 cache that has multiple ports. The inventive cache uses separate queuing structures for data and instructions, thus allowing out-of-order processing. The inventive cache uses ordering mechanisms that guarantee program order when there are address conflicts and architectural ordering requirements. The queuing structures are snoopable by other processors of a multiprocessor system. This is required because the tags are before the queues in the pipeline. Note that this means the queue contains tag state including hit/miss information. When a snoop is performed on the tags, if it is not also performed on the queue, the queue would believe it has a hit for a line no longer present in the cache. Thus, the queue must be snoopable by other processors in the system.

The inventive cache has a tag access bypass around the queuing structures, to allow for speculative checking by other levels of cache and for lower latency if the queues are empty. The inventive cache allows for at least four accesses to be processed simultaneously. The results of the access can be sent to multiple consumers. The multiported nature of the inventive cache allows for a very high bandwidth to be processed through this cache with a low latency.

The inventive cache uses a queuing structure which provides out-of-order cache memory access support for multiple accesses, as well as support for managing bank conflicts and address conflicts. The inventive cache manages architectural ordering support. In prior art, it has been difficult to provide multiple concurrent access support. The inventive cache can support four data accesses that are hits per clocks, support one access that misses the L1 cache every clock, and support one instruction access every clock. The responses, for example, fills and write-backs, are interspersed in the pipeline, so that conflicts in the queue are minimized. Non-conflicting accesses are not inhibited, however, conflicting accesses are held up until the conflict clears. Thus, the inventive caches has better access conflict management in the issuing from the queuing structure. An essential component to this cache is the out-of-order support. The inventive cache provides significant out-of-order support after the retirement stage of a pipeline, which is different from other out-of-order pipeline implementations. This implementation can operate on cache accesses known to be needed by the CPU core. An out of order implementations may have to stop servicing an access if an older access faults.

It is a technical advantage of the invention to be able to issue four accesses per clock and retire four accesses per clock on the data queue, and be able to issue one instruction access per two clocks and retire one instruction access per clock.

It is another technical advantage of the invention to embed bank conflict and address conflict mechanisms in the queue in order to be able to more efficiently issue four accesses per clock.

It is a further technical advantage of the invention to embed architectural ordering support in the queue so that accesses that are not currently able to be issued due to ordering constraints can be skipped and accesses that can be done based on their ordering constraints are issued.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 4 depicts the flow of information for data inserts into the queues of the L1 cache;

FIG. 5 depicts the stages wherein access entries are issued from the queues;

FIG. 7 depicts a prior art arrangement for a cache structure.

DETAILED DESCRIPTION

Figure 1:
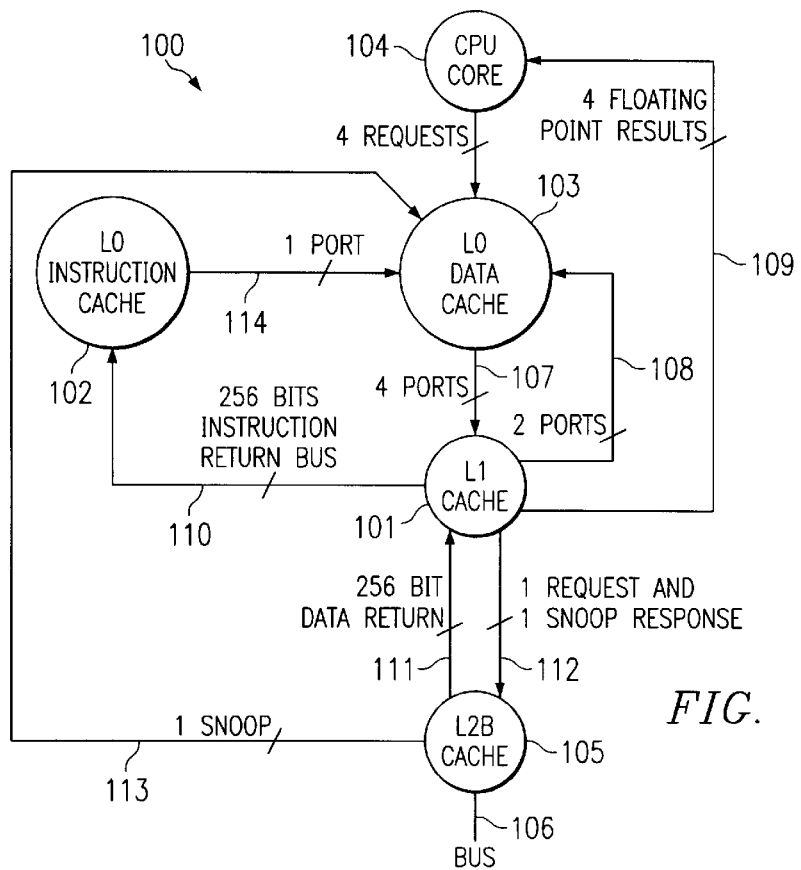
FIG. 1 is a block diagram depicting the inventive cache arrangement.

FIG. 1 is a block diagram depicting the arrangement 10 of the L1 cache 11 with the L0 instruction cache 12, L0 data cache 13, CPU 14, and the L2 cache 15 and the information pathways between the caches, CPU 14, and system bus 16.

The L1 cache 11, which is a combined data and instruction cache, receives access requests from the L0 data cache 13. Included in that L1 cache are queuing structures that hold the tags and the data for information stored in the cache. The L1 cache is configured to be able to receive, every clock cycle, 4 accesses or access requests from the L0 data cache, via 4 ports 107. The accesses may be stores or loads. A store is a memory access request desiring to write data to cache. A load is a memory access request desiring to read data from the cache. L1 cache uses a pipeline and two queues to manage the access requests. The accesses can be pulled from the pipeline or the queues for processing. The L1 cache may supply up to two integer results per clock, via two ports 108, to the L0 data (L0d) cache 103. These integer results may be sent by the L0d cache to the integer general registers in the CPU core 104. The L1 cache can also supply up to 4 floating point results per clock, via four ports 109, directly to the floating point registers of the CPU core 104. The L1 cache can also send 256 bits of instruction data to the L0i cache via return bus 110. The interfaces permit the L1 cache to communicate with the other caches, CPU, and other elements coupled to the bus 106. Bus 113 provides multiprocessor support, by allowing snoop requests from other processors to access the L0 cache. Note that a snoop request will be passed onto L1 cache as if the snoop was a CPU request.

Path 114, between L0 instruction cache and L0 data cache, is for instruction fetch requests that have missed the L0 instruction cache. The L0i cache makes a request of the L0 data cache for a line of memory containing instructions to execute. The L0 data cache utilizes an unused one of the 4 ports 107 to send the instruction request to the L1 cache 101.

Path 112 is actually 2 paths. The request part of path 112 is used for sending data or instruction accesses to the L2 cache 105. These requests may be speculatively sent, i.e. before knowledge of an access miss of the L1 cache in order to minimize the latency of accessing the L2 cache. The L2 provides a full line of data in 4 clocks over the data return bus 111 to the L1 cache 101. The L1 cache fills the full line of data into the L1 cache and can bypass the result to the necessary consumer which could be any of 102, 103, or 104. The other path of path 112 is the snoop response path. For a snoop of the L1 cache, the L1 provides a report to the L2/Bus Cluster regarding the status of the line in the L1 cache. This result is provided utilizing the snoop response path part of path 112.

Note that instruction return bus 110, new access ports 107, integer return ports 108, and fp return ports 109, L2 request port 112, and data return bus 111 can all be active at the same with some restrictions. The biggest restriction is on the fp return ports 109, integer return ports 108, and instruction return ports 110. There are several possible maximal combinations of activity that can be supported. The limitations are based upon the 4 access per clock limitation for data accesses, and the array limitations of only being able to supply 512 bits per clock, and the oversubscribe logic which can alleviate resource conflict blockages to some extent. The possible simultaneous port usage from L1 return ports 109, 108, and 110, is as follow:

| FP Ports | Integer Ports | Instruction |
|----------|---------------|-------------|
| 2 | 2 | yes |
| 4 | 0 | yes |
| 4 | 2 | no |

Note that the two integer ports with the four fp ports are really using the integer ports to send a line of data to the L0d cache.

The arrangement 100 would operates as follows. For example, the CPU 104 issues an integer load type instruction, which is sent to the L0 data cache and to the L1 cache in parallel. The tags of each cache are accessed in parallel. Note that the tags of the L1 cache are being accessed speculatively, in other words assuming that the L0 data cache does not have the data and will miss. If the L0 data cache does miss, then the L1 will use the results of that speculative tag access to determine if it has the data or not. If the L0 data cache does have the requested data, then the L0 will return the data to the CPU core register file, and the L1 will halt accessing, even though it has speculatively accessed the tags and may have also speculatively accessed the data. The L0 data cache sends a signal to the L1 cache to inform the L1 cache of a hit or miss. If the L0 data cache has a miss, and the L1 cache has a hit, then the integer data is returned to the L0 data cache 103, via ports 108. The data could be used in moving a line of data up to the L0 data cache, or sent to, via the L0 data cache, to the CPU core integer register file, or both.

After the L1 cache receives the speculative request from the L0 cache, the L1 cache sends a speculative request to the L2 cache. If the L1 cache misses, then the L1 cache allocates a line in its array, in anticipation of a data return from L2 cache. Note that bus 112, which carries the speculative request to the L2 cache is a single port bus, capable of carrying one request per clock cycle, so priority select structures are used to connect the appropriate L2 cache structures to the bus. If the L2 cache has the data, and assuming that the L0 cache and the L1 cache do not, then the L2 cache will send that data back to the L1 cache. The L1 cache will fill that data into the L1 cache. First, it buffers up an entire line, including the requested data, and then it writes the line into the L1 cache array. In parallel with the buffering, the cache also sends the requested data to the L0 data cache, and/or the CPU core. If the L2 misses, the L2 uses its BRQ structure, or Bus Request Queue, to send a request onto the processor interface memory bus 106 or system bus. This request will retrieve a line from RAM memory. Note that the L2 cache may be larger than the L1 cache, and the L1 cache may be larger then the combination of L0 instruction cache and L0 data cache. Also note that the L0 cache is split so that the relevant portions are located closer to the processor consumer components that use the respective cache portions, thereby reducing latency. Further note that L0, L1 and L2 may all be located on the processor chip to reduce latency.

Figure 2A:
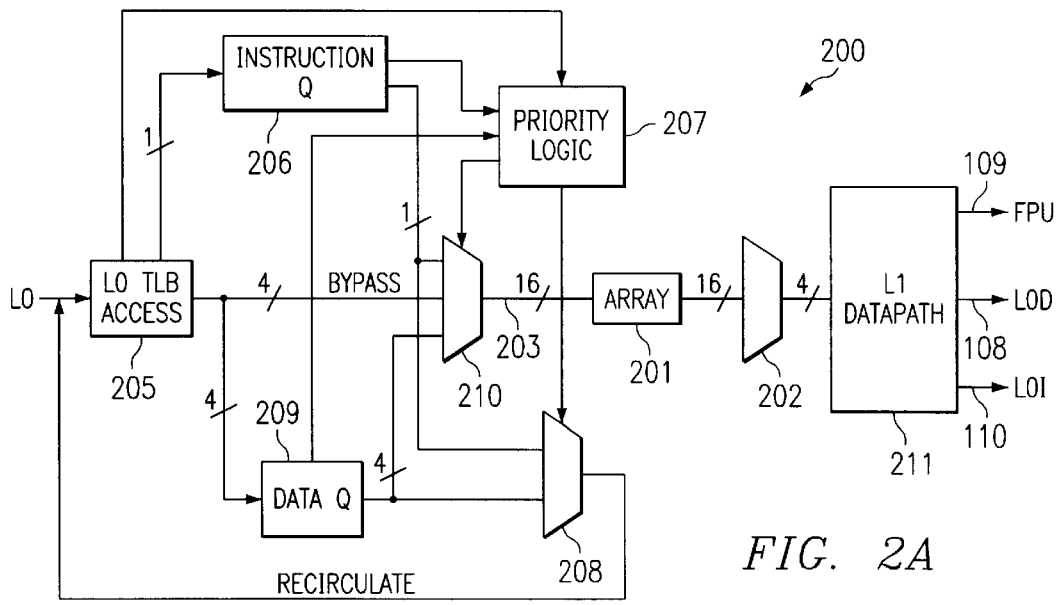
FIGS. 2A–2B depict the internal elements of the L1 cache of FIG. 1.

FIG. 2A depicts the arrangement 200 of elements of the L1 cache 101 of FIG. 1 used in managing a load access or instruction fetch from the L0 cache. The pipeline stages for an access that flows through to access the L1 tags are L0M, L0D, and L0W. The pipeline stages for an access that flows through to access the L1 cache are L1N, L1, L1A, L1M, L1D, L1C, and L1W. This flow arrangement 200 begins with the tag access and ends with the return of the result (data) to the L0 cache or to the CPU. An access, including the physical address, is sent from the L0 data cache to the L1 cache, wherein the tags are accessed 205 to determine it there is a hit. Note that block 205 combines the L0d cache and the TLB. The L1 cache tags are not inside block 205. They could be drawn as a separate box parallel to L0d cache/TLB 205. Then, the tags would be accessed in parallel to 205, and 205 would show an output (physical address) feeding the L1 tags to finalize the tag hit information. Further note that this is true for both data and instruction accesses. If there is a hit, the access is sent to either the instruction queue 206 or the data queue 209. The instruction queue holds up to eight entries until they are completed or passed on to the L2 cache. The data queue 209 holds up to thirty two entries until they are completed or passed on to the L2 cache. The queues are split to prevent priority problems between the instructions and data. Entries that are issued out of each queue, but which are not processed through MUX 210 are recirculated by MUX 208 back to the L1 tag access 205 stage for re-entry back into their respective queues.

Priority logic 207 controls the MUX 210, and thereby chooses one of the data queue 209 (up to four locations) and the instruction queue 206 as providing the source of the location for the array 201. MUX 210 may also select from the L1 tag access 205, thereby bypassing the queues. A bypass is selected when nothing 'better' is available to choose, i.e. if there is an access the data or the instruction queue have to process, that will be done instead of the bypass. This is good because it helps do things in program order, and because the bypasses are speculative, i.e. these accesses may be able to have their data provided by the L0d cache. The priority logic uses information about what each of the queues will issue next and determines which information has priority, and selects the higher priority source. Note that MUX 210 is cascaded or multi-leveled MUX, but is shown as a single level MUX for simplicity. The output of the MUX 210 is used as control information in selecting the locations to read in the array 201. The control information comprises an address or index, way, and read/write (load/ store) information. Note that the output from MUX 210 has 16 buses, one for each of 16 banks of the array. The desired bit line is read out from the array 201, and mapped onto the four port buses by MUX 202. The bit line is sent through the L1 data path 211 to one of three consumers, the CPU via floating point result buses 109, the L0 data cache via two port buses 108, or the L0 instruction cache via return bus 110. Note that store requests are processed in a similar manner.

Figure 2B:
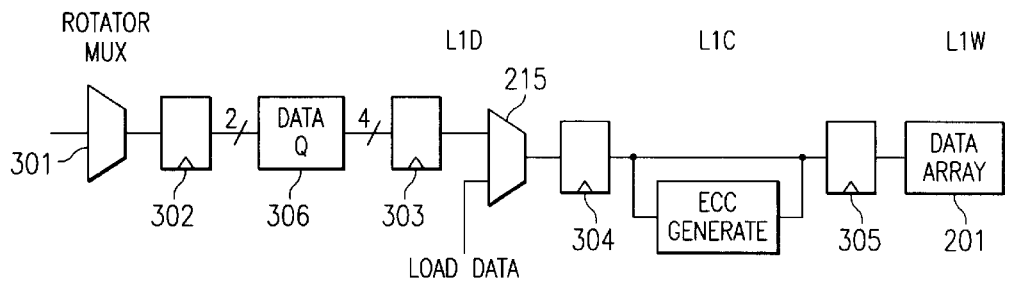

FIG. 2B depicts the flow of data in a store operation. This flow begins with rotator MUX 301, which puts the register file data into memory format. The latches 302, 303, 304, 305 are used to maintain timing in the pipeline. After rotation, the data is placed into data queue 306, which is different from data queue 209. Data queue 209 holds an address, while data queue 306 hold the data to be associated with the address. Note that a maximum of 2 stores per cycle are received, but a total of 4 accesses total per cycle may be received. Thus, the MUX/latch/queue 301, 302, and 306 are designed to only accept 2 accesses per clock, the specific 2 stores possible per clock. MUX 215 allows for data loaded for a read/modify/write operation from P0–P3 to be stored. ECC is generated for the data, which is then stored into the array 201 along with the data.

Figure 3:
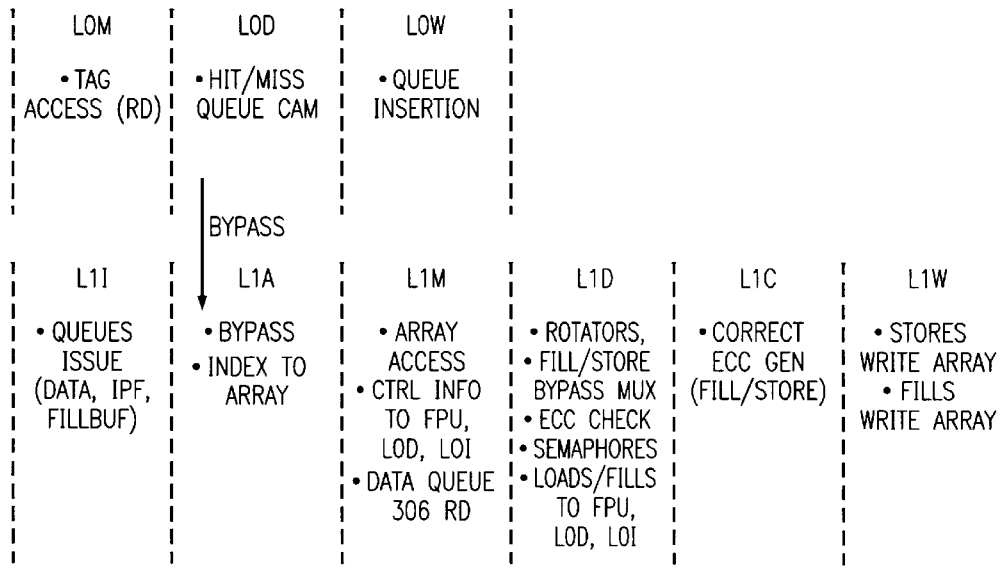
FIG. 3 is a flow diagram depicting the pipeline operations of the L1 cache.

FIG. 3 depicts the two pipelines involved in the load/store operations of the L1 cache. Note that the bypass of FIG. 3 is the same as that of FIG. 2A.

FIG. 4 depicts the flow of information for data inserts into the queues of the L1 cache 101. The lower pipeline 401 corresponds to the pipeline of FIG. 3, described above. The upper pipeline 302 is the main CPU pipeline and comprises the EXE (execution), DET (exception detection), and WB (write-back) stages. The physical address 404 of the access request is received in the L0M stage. The store data 405 is sent by CPU in the EXE stage. The inserts occur in stage L0W. The L1 cache uses five queues.

The first queue is the data queue 306, which holds the actual data used in the store operation. The data is inserted into the queue in stage L0W 403. This data will be read out later for the store into the L1 array. The next queue is the fill buffer 505, 506, 407. This queue is used to hold information about requests made to the L2 cache or bus cluster. Such requests are processed when there is a miss for the L1 cache. The information in the queue is used in processing data returns from the L2 cache or bus cluster, and for managing address conflicts. The third queue is data queue 209, which holds the address and other information, such as control and ordering information, that is associated with the write data that is being stored into queue 306. Control information includes whether the access is a L1 cache hit, a L1 cache miss, or a re-circulate. Other information includes memory type, whether the access is a write-back, write-through, or uncacheable. Also whether or not to fill the L0 cache, and if so information regarding the fill associated with this access. Further information details whether the access has been successfully retired from the CPU pipeline, which applies if the access does not have any faults or trapping indications that would prevent it from updating memory or returning data to a target register (for a load). The queue can hold 32 entries. This information is used in accessing the L1 cache, issuing data to the L2 cache, and ordering and address conflict management. The next queue is the instruction queue 206. Instructions, when they arrive in the L1 cache are routed to the instruction queue. The instruction queue is managed with a different algorithm than the data queue 209, because the ordering requirements for instruction accesses are different than for data accesses.

The arrangement of FIG. 4 operates as follows. The store data enters through rotator 301 in DET stage, see FIG. 2B.

The store data is then stored 403 into data queue 306, via latch 302, in the WRB stage of CPU pipeline 402. These steps format the store data into memory format and insert the data into the data queue 306. The physical address 404 from the TLB and the other access information 406 is received in the L0M stage. The other access information comprises op code, data size, and miscellaneous information from the TLB such as memory attribute type. CAM checks 407, 408, or content addressable memory, is performed on the Fill Buffer and the Data Queue 209 to determine whether there are any conflicts with other pending access requests in the next stage, namely L0D. A cam check compares the address of the access request with the addresses of the access entries in the queues.

If there are misses on both the fill buffer and the data queue cams, then there are no conflicts with queue entries and the data queues and instruction queues are inserted as needed.

If there is a hit on the fill buffer cam, then a prior request missed in L1 cache, and a request entry is pending for the data from either L2 cache or the bus cluster. Note that a hit on the fill buffer cam does not necessarily mean that there will be hit in the data queue 209 cam as well. The access request that matched is inserted as a re-circulate entry into either the data queue or the instruction queue, as appropriate. The re-circulated entry will not access the cache until the prior miss is returned.

If there is a hit on the data queue cam, then its disposition depends on the L1 tag match information of both the access and the entry. If both the access and the conflicting entry have L1 hits, then the access is inserted into the data queue as a L1 hit entry. If the access has an L1 miss and the entry has an L1 hit, then the access is inserted into the data queue as a L1 miss entry. An illegal state is where the access has an L1 hit and the entry has an L1 miss, as this combination cannot occur. If both the access and the entry are L1 misses, then the access is inserted into the data queue as a re-circulate entry.

Hits in the L1 cache are managed according to their access type, e.g. load or store, and access size. If one (or both) of the matching accesses, old or new, is a store, then conflict information regarding the matching addresses is stored in the queue along with the newer access. The conflict information invokes a special architectural ordering mechanism called Effective Release. The issue algorithm uses this mechanism to ensure that the newer access is not issued before the older access. Specifically, when one of the accesses is a store, then the accesses are issued in order. If both of the matching accesses are loads, then they can be issued in any order.

Size of the different conflicting accesses is taken into account. For example, one request is a load request (read operation) that is promoting a cache line from the L1 cache into the L0 data cache, i.e. a fill for the L0 data cache, and a second request is a store operation that is stored data into a portion of the cache line of the load access. Size works to enable or disable particular address bits in the CAM, which will be detected by the CAM checks. Size can be viewed as a mask on the CAM function.

There are three states for an access in both the data queue 209 and the instruction queue 206, specifically, L1 hit, L1 miss and re-circulate. The fill buffer has one state, namely L1 miss. Re-circulation is a stalling mechanism that routes the one of the four accesses back to the L0M stage, wherein the tags are re-accessed, see FIG. 2A, discussed above. Re-circulation allows for accesses to be stalled, for example, if an access has a conflict with a previous miss, which is waiting for data to return from L2 cache or the bus cluster, then the newer access can be re-circulated until the data arrives. Re-circulation is unlimited in terms of the number of times that an access may be re-circulated. Note that hit and miss here mean hit and miss as determined by the L1 tag access check, not the fill buffer and data queue cam checks. The L1 tag access check is performed in parallel with the L0 TLB access. A "miss" is sent to the L2 cache or the bus cluster, while a "hit" indicates that the data is in the L1 cache, and can be retrieved from the L1 cache.

When attempting to insert an access into the data queue 401, in addition to the ordering and address information, bank conflict information 409 is also determined in order to optimize the issuing algorithm. This information is related to the design of the cache memory array. Ideally, in processing multiple accesses simultaneously, each access would be accessing different memory banks, as two accesses involving the same bank cannot be processed in the same cycle (not that one or more banks may be involving in an access). Thus, accesses involving the same memory bank(s) are assigned different issuing cycles to improve performance. Any bank conflicts are stored along with the access into the data queue 209. Note that inserts of instructions 206 are not checked, as only one instruction can be stored or loaded in one cycle, whereas multiple data accesses (four) can be performed in a single cycle, so there are no ordering conflicts with instructions. However, instructions will have address conflict checks similar to those performed for data, e.g. cam 408, so that only one miss is tracked at a time.

FIG. 5 depicts the stages wherein access entries are issued from the queues. The data queue 209 selects or nominates 501 multiple accesses to issue, up to four in the L1N or nominate stage. Nominated accesses can be chosen from those labeled as L1 hits or re-circulates. The nominated accesses are read out 502 in the L1I stage or issue stage. MUX 210 selects the proper inputs as addresses for the array. Note that one of the inputs is a bypass from the L0D stage, shown in FIG. 4. Note that another input is a store in the L1D stage, from data queue 209 for address muxing. This input is used for read-write operations, wherein first a read or load operation is performed, and then the data is to be written back into cache. The store address information is retrieved from the L1D stage and used in a subsequent L1I stage. Note that bypass 801 is the same bypass of FIG. 3.

In addition to the issuing of data accesses, the cache can also issue instruction accesses, one per two clocks. Note that both data and instruction issues can occur in parallel (or simultaneously) if the data access is a store, however a load access will be canceled if the instruction access is not canceled. The instruction queue reads the appropriate instruction, and via muxes, the access is routed to its consumer destination, e.g. to array 201 or to L2 cache 105. Information of the issued L2 access is written 505 into the fill buffer in stage L1M. When information from L2 or bus cluster is received 507, the fill buffer is read 506 to locate the proper address information, which is then used to insert the data into the L1 array. Alternatively, if a cache line is being cast out to memory, e.g. a modified line is being written back to memory, then that information also comes from the fill buffer read 506.

Figure 6A:
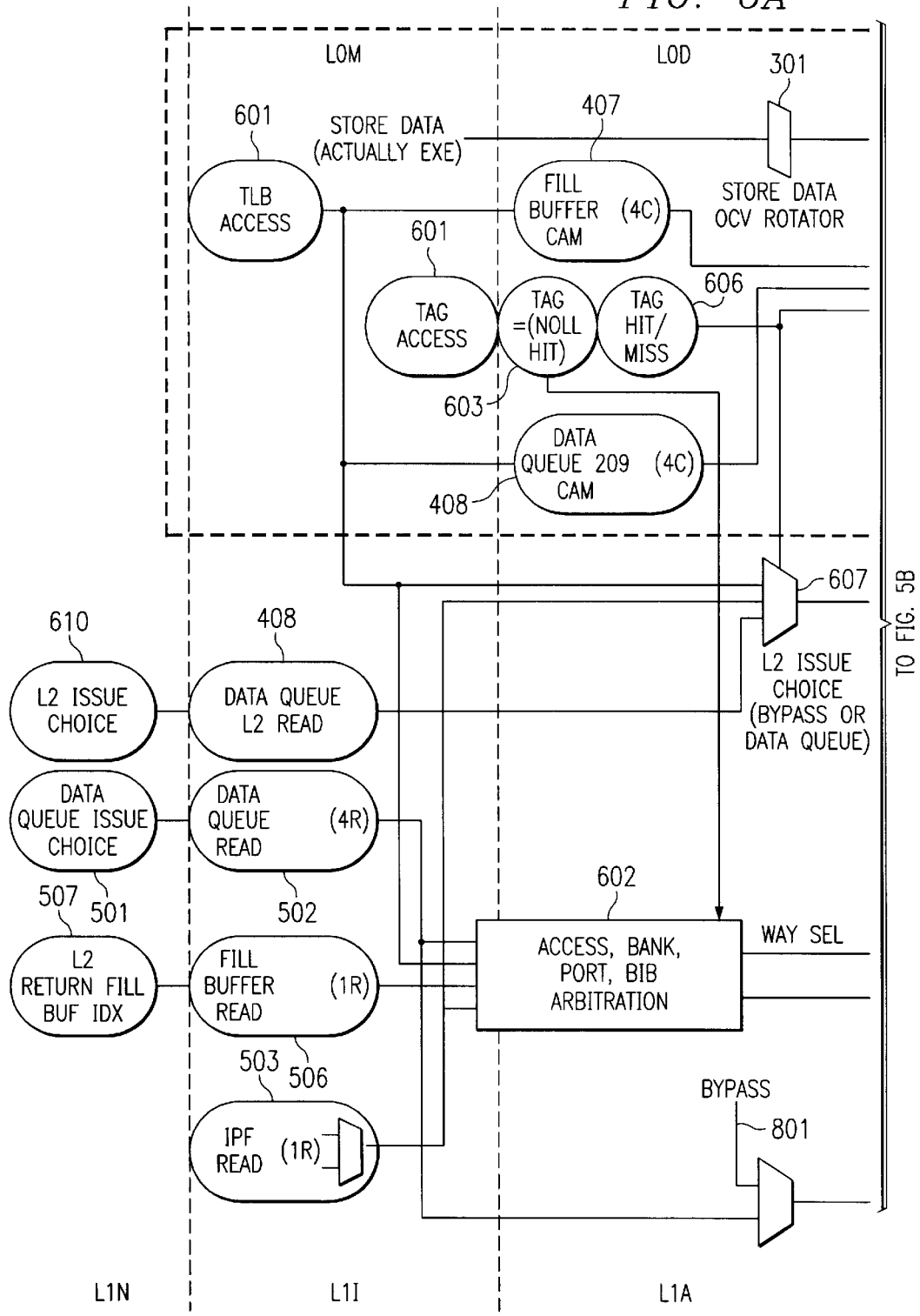
FIGS. 6A and 6B are a combination of FIGS. 4 and 5, along with other elements of FIGS. 1–3.
Figure 6B:
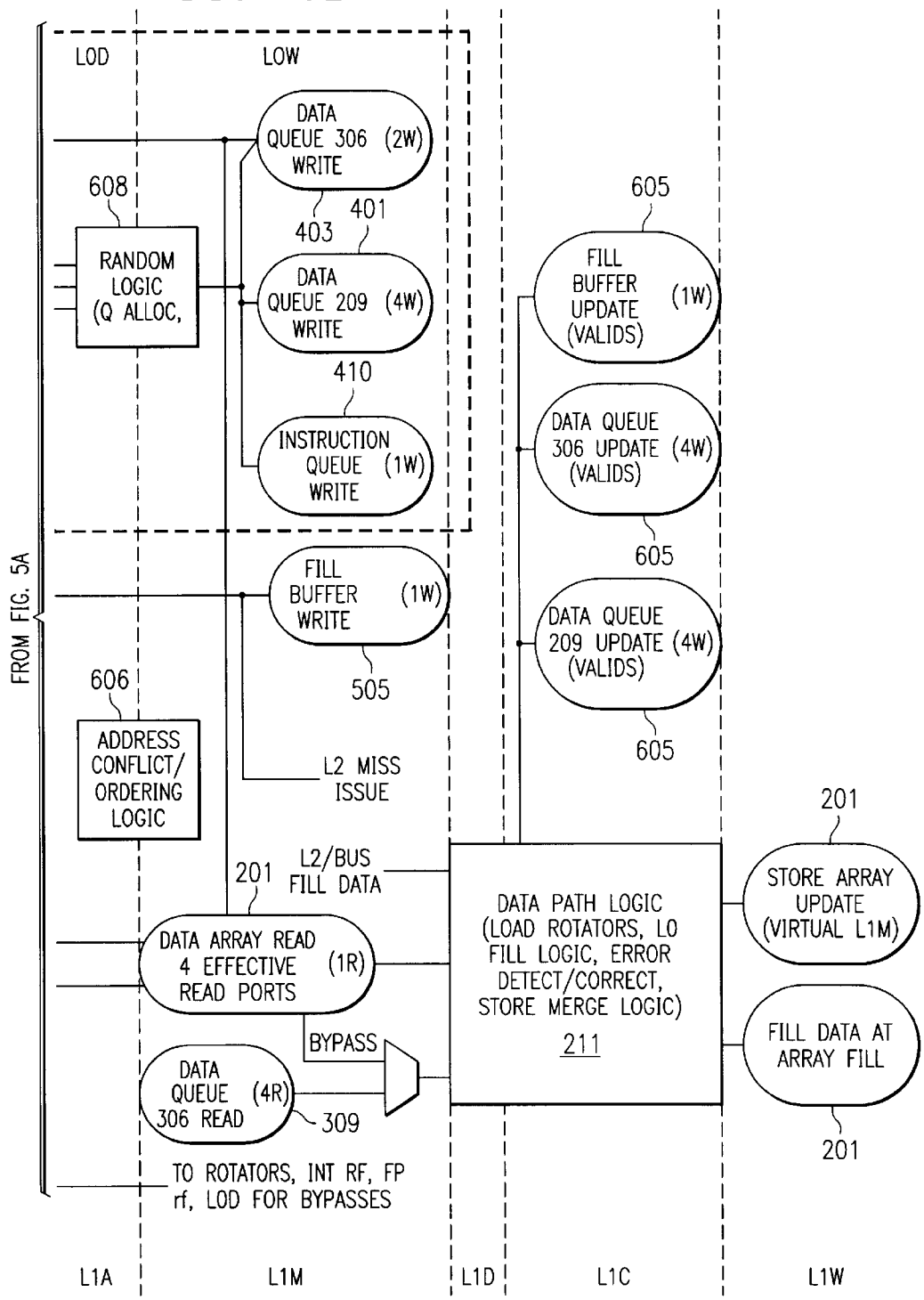

FIGS. 6A and 6B are a combination of FIGS. 4 and 5, along with other elements of FIGS. 1–3. The TLB access 601 produces the physical address 404 used in accessing the array, via access, port, arbitration logic 602. This logic also receives tag match information 603 from the tag access 604. Note that the tag access information is being speculatively provided to the logic in stage L0M, however, matching knowledge is determined in stage L0D. Note that the reason that the match information is received in stage L0D is wire delay. Thus in some FIGURES the bypass information may be shown as stage L0D.

Tag Match logic 603 combines with MESI status and operation type to generate Tag Hit/Miss 606. This output is used to determine the state of an access inserting into the queue 401. The logic that does this determination is an "Random Logic", 608. This logic has a need to sometimes change an L1 miss into an access requiring a re-circulate. This is because of address conflicts and misses to the same index of the cache.

In order to choose an access to issue to the L2, the instruction Q 503 and the data Q 610 make a choice of an access to issue to the L2. Each reads out the access (Data Q read occurs in 609), and each sends the L2 issue choice to the L2 Issue Choice MUX 607. In addition, 4 accesses from the bypass can be taken for an L2 issue choice. They are available to MUX 607 via the path from TLB 601. MUX 607 chooses one of these six accesses to send to the L2 cache and inserts the access into fill buffer 505 if the access will be returning information to the L1 cache.

Re-circulates occur when an access must access the L1 tags again. An example would be two accesses missing the L1 cache in the same cycle and having the same cache index. The tag block generating the hit/miss information 603 and 606 does not have logic allowing two different ways to be chosen for the same index in one cycle. Thus, one of the two accesses must access the tags again later in order to be assigned a way to fill with new data. Random logic 608 determines this and inserts one of the two accesses as a re-circulate into the data Q 401.

When the recirculating access issues from the data Q 502 after having been chosen by data Q issue choice logic 501, said recirculating access is sent to the L0m pipeline stage to re-access the tag block in 604, 603, and 606. When this occurs, this access is allowed to determine which way will be filled by the memory data as it is returned to the cache. And, the data Q contents are updated (401) by random logic 608 to indicate an L1 miss instead of a re-circulate.

FIG. 6 also depicts the queue updates 605. Updates take place after the access is finished at the end of the pipeline. Thus, update take place when there are no errors and the accesses are complete. Any changes in status to the accesses are made. Entries that have completed are marked invalid for overwrite.

The address conflict/ordering logic 606 is part of the issuing algorithm. This logic detects conflicts between issuing resources. This logic will cancel or stall issues to allow conflicts to be resolved. Canceled accesses will be re-selected by the issue choice logic. Early updates of the conflict logic will prevent conflicting accesses from being carried to issue and allowing other accesses to issue, thereby saving resources.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer system comprising:
   a processor that executes instructions; and
   a multi-level cache structure accessible by said processor to satisfy memory access requests, wherein said multi-level cache structure is configured to receive multiple memory access requests, process the multiple requests in parallel to determine whether one of said multiple levels is capable of satisfying the multiple received memory access requests;
   wherein one level of the multi-level cache structure comprises:
      tag access logic that compares the addresses of each access request with tags of information stored in the one level to determine whether there is a match;
      a queue for holding entries of address information for accesses that have been operated on by the tag access logic; and
      conflict logic for checking each access request with the entries of the queue for conflicts prior to insertion of each access request into the queue.

2. The system of claim 1 wherein:
   the queue is a fill buffer for holding information on requests sent to another level of the multi-level cache;
   wherein if the check results in no conflicts, When the access in inserted into another queue and is marked according to the results of the tag access logic, and if the check results in a conflict with an entry of the queue, then the access request is inserted into another queue and marked as re-circulate, thereby indicating that the access request will not issue prior to the conflicting entry.

3. The system of claim 2 wherein:
   a re-circulated entry is sent back to the tag access logic for a re-comparison of its address with the tags of information stored in the one level to determine whether there is a match, whereby a re-circulated entry is re-circulated until the conflict clears.

4. The system of claim 1 wherein:
   the queue is a data queue;
   wherein if the check results in no conflicts, then the access in inserted into one of the queue and another queue, and is marked according to the results of the tag access logic, and if the check results in a conflict with an entry of the queue, then the access request is inserted into one of the queue and another queue, and marked according to the results of the tag access logic of the access and the conflicting entry.

5. The system of claim 4 wherein:
   if both the entry and access are tag access logic hit, then the access is inserted into one of the queue and another queue, marked as a tag access logic hit;
   if the entry has a tag access logic hit and the access has a tag access logic miss, then the access is inserted into one of the queue and another queue, marked as a tag access logic miss; and
   if both the entry and access are tag access logic miss, then the access is inserted into one of the queue and another queue, marked as a re-circulate, thereby indicating that the access request will not issue prior to the conflicting entry.

6. The system of claim 5 wherein:
a re-circulated entry is sent back to the tag access logic for a re-comparison of its address with the tags of information stored in the one level to determine whether there is a match, whereby a re-circulated entry is re-circulated until the conflict clears.

7. The system of claim 1 wherein one level of the multi-level cache structure comprises:
a memory array for storing data that is arranged in a plurality of banks;
bank conflict logic for checking each access request with the entries of the queue for bank conflicts prior to insertion of each access request into the queue, wherein a bank conflict arises when an access request is to the same memory bank as an entry;
wherein an access with a bank conflict is inserted into the queue along with information describing the conflict, whereby the access and conflicting entry will be issued from the queue at different cycles.

8. The system of claim 1 wherein:
the queue is updated to include changes in status of the entries.

9. A method of accessing a multi-level cache of a computer system, the method comprising the steps of:
receiving multiple memory access requests into a multi-level cache structure;
processing the multiple requests in parallel to determine whether one of said multiple levels is capable of satisfying the multiple received memory access requests, and
if determined that at least one the memory access requests can be satisfied by a level of the multi-level cache structure, then satisfying the one memory access request by the level of the multi-level cache structure;
comparing the addresses of each request with tags of information stored in the cache structure to determine whether there is a match with tag access logic;
holding address information for accesses that have been processed by the step of comparing in a queue;
checking each access request with the entries of the queue for conflicts prior to insertion of each access request into the queue with conflict logic.

10. The method of claim 9 wherein the queue is a fill buffer on one level of the multi-level cache for holding information on requests sent to another level of the multi-level cache, the method further comprising the steps of:
if the check results in no conflicts, then inserting the access into another queue marked according to the results of the tag access logic; and
if the check results in a conflict with an entry of the queue, then inserting the access request into another queue marked as re-circulate, thereby indicating that the access request will not issue prior to the conflicting entry.

11. The method of claim 10 further comprising the step of:
sending a re-circulated entry back to the tag access logic for a re-comparison of its address with the tags of information stored in the one level to determine whether there is a match, whereby a re-circulated entry is re-circulated until the conflict clears.

12. The method of claim 9 wherein the queue is a data queue, the method further comprising the steps of:

if the check results in no conflicts, then inserting the access into one of the queue and another queue, and marked according to the results of the tag access logic; and
if the check results in a conflict with an entry of the queue, then inserting the access request into one of the queue and another queue, and marked according to the results of the tag access logic of the access and the conflicting entry.

13. The method of claim 12 wherein the step of inserting the access request into one of the queue and another queue, marked according to the results of the tag access logic of the access and the conflicting entry comprises the steps of:
if both the entry and access are tag access logic hit, then inserting the access into one of the queue and another queue, marked as a tag access logic hit;
if the entry has a tag access logic hit and the access has a tag access logic miss, then inserting the access into one of the queue and another queue, marked as a tag access logic miss; and
if both the entry and access are tag access logic miss, then inserting the access into one of the queue and another queue, marked as a re-circulate, thereby indicating that the access request will not issue prior to the conflicting entry.

14. The method of claim 13 further comprising the step of:
sending a re-circulated entry back to the tag access logic for a re-comparison of its address with the tags of information stored in the one level to determine whether there is a match, whereby a re-circulated entry is re-circulated until the conflict clears.

15. The method of claim 9 wherein the multi-level cache structure includes a memory array for storing data that is arranged in a plurality of banks; the method further comprising the steps of:
checking each access request with the entries of the queue for bank conflicts prior to insertion of each access request into the queue, wherein a bank conflict arises when an access request is to the same memory bank as an entry with bank conflict logic; and
inserting an access with a bank conflict into the queue along with information describing the conflict, whereby the access and conflicting entry will be issued from the queue at different cycles.

16. The method of claim 9 further comprising the step of:
updating the queue to include changes in status of the entries of the queue.

17. A computer system comprising:
a processor that executes instructions;
means for receiving multiple memory access requests into a multi-level cache structure;
means for processing the multiple requests in parallel to determine whether one of said multiple levels is capable of satisfying the multiple received memory access requests, and if determined that at least one of the memory access requests can be satisfied by a level of the multi-level cache structure, then satisfying the one memory access request by the level of the multi-level cache structure;
means for comparing the addresses of each request with tags of information stored in the cache structure to determine whether there is a match;
a queue for holding address information for accesses that have been operated on by the means for comparing; and
means for checking each access request with the entries of the queue for conflicts prior to insertion of each access request into the queue.

18. The system of claim 17 wherein the queue is a fill buffer on one level of the multi-level cache for holding information on requests sent to another level of the multi-level cache, the system further comprising:

means for inserting the access into another queue marked according to the results of the tag access logic if the check results in no conflicts;

means for inserting the access request into another queue marked as re-circulate if the check results in a conflict with an entry of the queue; and means for sending a re-circulated entry back to the means for comparing for a re-comparison of its address with the tags of information stored in the one level to determine whether there is a match, whereby a re-circulated entry is re-circulated until the conflict clears.

19. The system of claim 17 wherein the queue is a data queue, the system further comprising:

means for inserting the access into one of the queue and another queue, marked according to the results of the tag access logic if the check results in no conflicts; and means for inserting the access request into one of the queue and another queue, marked according to the results of the tag access logic of the access and the conflicting entry if the check results in a conflict with an entry of the queue;

wherein the means for inserting the access request into the one of the queue and another queue, marked according to the results of the tag access logic of the access and the conflicting entry includes:

means for inserting the access into one of the queue and another queue, marked as a tag access logic hit if both the entry and access are tag access logic hit;

means for inserting the access into one of the queue and another queue, marked as a tag access logic miss if the entry has a tag access logic hit and the access has a tag access logic miss; and means for inserting the access into one of the queue and another queue, marked as a re-circulate, thereby indicating that the access request will not issue prior to the conflicting entry if both the entry and access are tag access logic miss.

20. The system of claim 17 wherein the multi-level cache structure includes a memory array for storing data that is arranged in a plurality of banks; the system further comprising:

means for checking each access request with the entries of the queue for bank conflicts prior to insertion of each access request into the queue, wherein a bank conflict arises when an access request is to the same memory bank as an entry with bank conflict logic; and means for inserting an access with a bank conflict into the queue along with information describing the conflict, whereby the access and conflicting entry will be issued from the queue at different cycles.

21. The method of claim 9 wherein said level of the multi-level cache structure that will satisfy said at least one of the memory access requests is said level of the multi-level cache structure wherein said tags are stored.

22. The system of claim 17 wherein said level of the multi-level cache structure that will satisfy said at least one of the memory access requests is said level of the multi-level cache structure wherein said tags are stored.

23. The system of claim 1 wherein at least one of said access requests is issued from said queue to at least one destination selected from the group consisting of another level of the multi-level cache structure and a bus.

24. The method of claim 9 further comprising issuing at least one of said access requests from said queue to at least one destination selected from the group consisting of another level of the cache structure with respect to the level wherein said tags are stored and a bus.

25. The system of claim 17 wherein at least one of said access requests is issued from said queue to at least one destination selected from the group consisting of another level of the cache structure with respect to the level wherein said tags are stored and a bus.

* * * * *